US012455695B2

(12) United States Patent
Singh et al.

(10) Patent No.: US 12,455,695 B2
(45) Date of Patent: Oct. 28, 2025

(54) RESERVED PERSISTENT RANDOM ACCESS MEMORY

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/618,350

(22) Filed: Mar. 27, 2024

(65) Prior Publication Data

US 2025/0306774 A1   Oct. 2, 2025

(51) Int. Cl.
  *G06F 3/06* (2006.01)
(52) U.S. Cl.
  CPC .......... *G06F 3/0622* (2013.01); *G06F 3/0632* (2013.01); *G06F 3/0643* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 6,854,054 B1* | 2/2005 | Kavanagh | G06F 9/4418 713/1 |
| 7,130,997 B2* | 10/2006 | Hsu | G06F 11/1441 713/1 |
| 9,152,402 B2 | 10/2015 | Scheidel et al. | |
| 9,875,115 B2* | 1/2018 | Russinovich | G06F 8/656 |
| 10,901,627 B1 | 1/2021 | Bshara | |
| 11,282,161 B2 | 3/2022 | Ray et al. | |
| 11,489,827 B2 | 11/2022 | Knotwell et al. | |
| 11,556,359 B2 | 1/2023 | Hart et al. | |
| 11,768,781 B2 | 9/2023 | Cooray et al. | |
| 11,775,651 B2 | 10/2023 | Jacobs | |

(Continued)

OTHER PUBLICATIONS

Seongwook, Jin et al., "Architectual Support for Secure Virtualization under a Vulnerable Hypervisor", 2011 44th Annual IEEE/ACM International Symposium on Microarchitecture (MICRO), Porto Alegre, Brazil, 2011, pp. 272-283 (12 pages).

*Primary Examiner* — Edward J Dudek, Jr.
(74) *Attorney, Agent, or Firm* — WOMBLE BOND DICKINSON (US) LLP

(57) ABSTRACT

Methods and systems for managing use and access to memory installed within a data processing system are disclosed. Primary memory (e.g., RAM such as DRAM, SRAM, or the like) that is traditionally non-persistent (e.g., volatile) is configured by a management entity hosted within the data processing system to become persistent (e.g., pseudo-persistent/pseudo non-volatile) to create a persistent reserved primary memory. Data may be stored in the created persistent reserved primary memory to allow processes that previously have to access slower secondary storage to obtain and use the data to be completed faster. The creation of the persistent reserved primary memory may be completed before a full start up process of the data processing system is completed. The data stored in the persistent reserved primary memory may also be retained (e.g., may not be lost) across reboots of the data processing system.

20 Claims, 7 Drawing Sheets

(56) References Cited

U.S. PATENT DOCUMENTS

| | | | |
|---|---|---|---|
| 2009/0054045 A1* | 2/2009 | Zakrzewski | G06F 9/4418 455/418 |
| 2012/0023319 A1* | 1/2012 | Chin | G06F 9/4418 718/1 |
| 2012/0060023 A1* | 3/2012 | Park | G06F 9/4406 713/2 |
| 2016/0364297 A1* | 12/2016 | Lo | G06F 9/4406 |
| 2018/0032349 A1* | 2/2018 | Bhimanadhuni | G06F 9/4406 |
| 2020/0356669 A1* | 11/2020 | Kim | G06F 3/064 |
| 2023/0136229 A1 | 5/2023 | Lee | |
| 2023/0297261 A1* | 9/2023 | Kim | G06F 3/0622 |

* cited by examiner

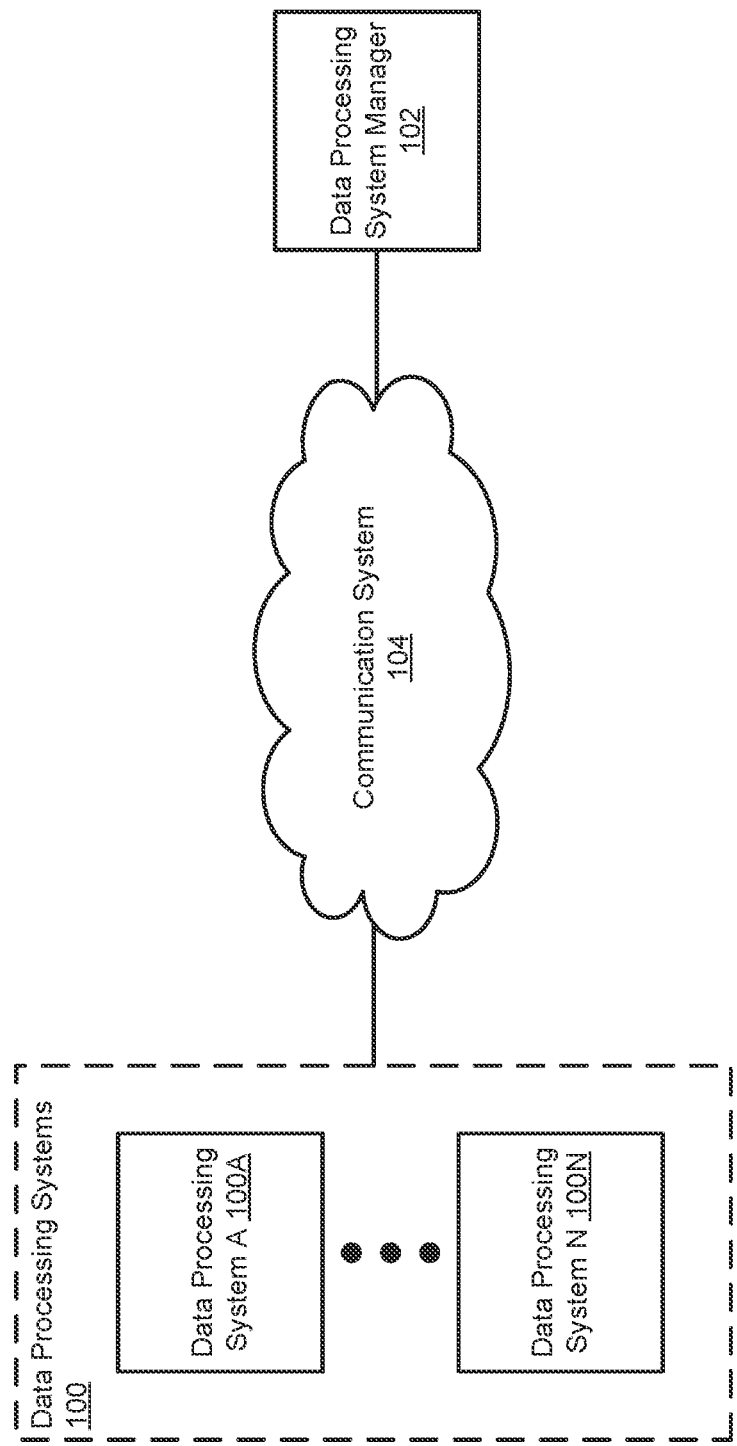

RESERVED PERSISTENT RANDOM ACCESS MEMORY

FIELD

Embodiments disclosed herein relate generally to management of memory. More particularly, embodiments disclosed herein relate to systems and methods to manage access to create reserved persistent random access memory (RAM) in a data processing system (e.g., a computing device).

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services. Users may input commands and interact with computing devices using HIDs.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with one or more embodiments.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
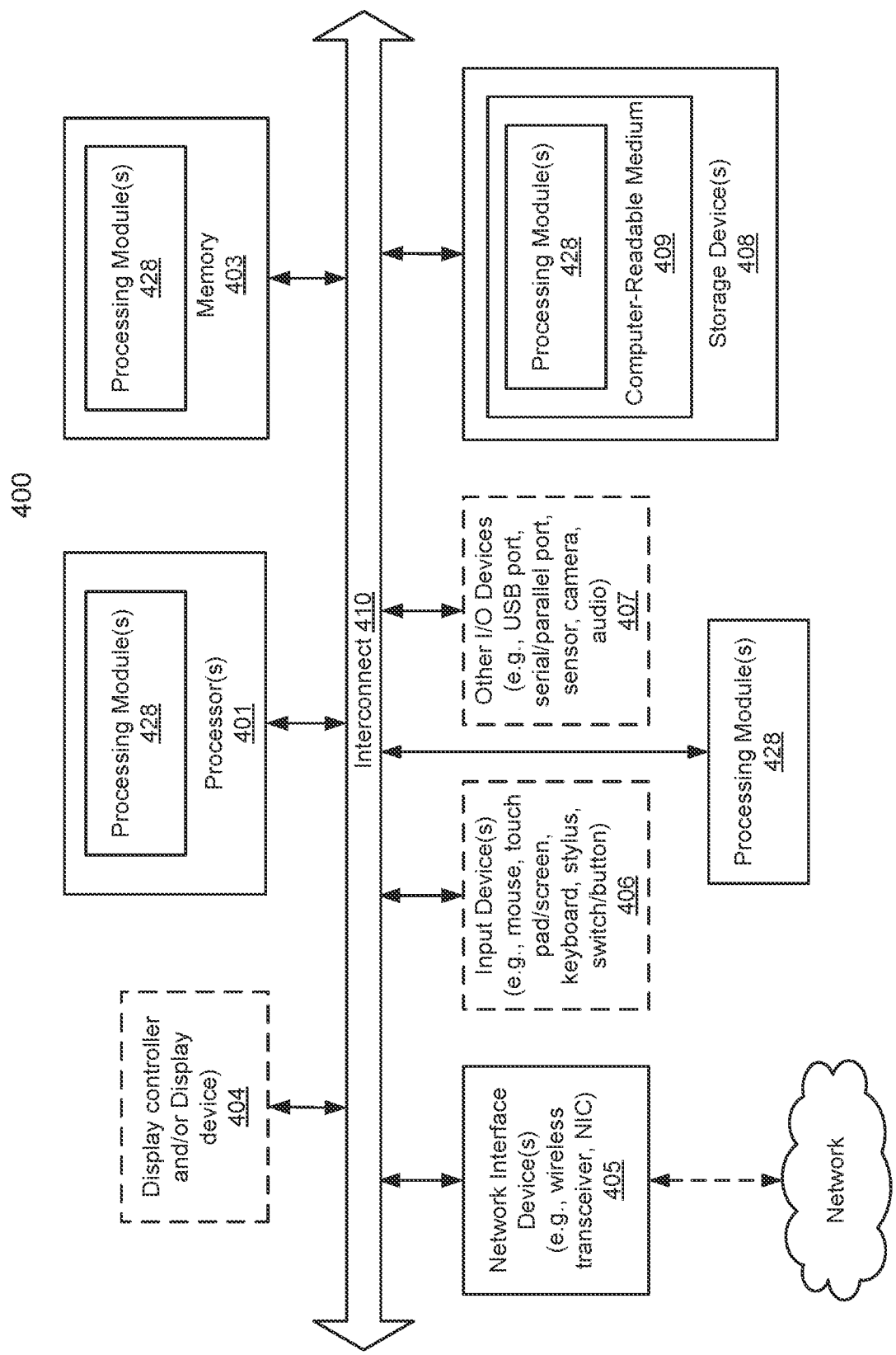
FIG. 4 shows a block diagram illustrating a computing device in accordance with one or more embodiments.

In general, embodiments disclosed herein relate to methods and systems for managing use and access to memory (namely, random access memory (RAM)) installed within a data processing system (such as computing devices, as described below in reference to FIG. 4).

Primary memory (e.g., RAM such as static RAM (SRAM), dynamic RAM (DRAM), non-volatile RAM (NVRAM), or the like) is faster than secondary storage (e.g., hard disk drives (HDDs), solid-state drives (SDDs), or the like) because primary memory is directly connected to a processor (e.g., central processing unit (CPU)) of the data processing system. Primary memory also uses faster technology and is designed for faster data access and processing.

Installation and/or repair of an operating system (OS) on the data processing system requires access to the secondary storage, which is much slower in comparison to accessing primary memory. Additionally, most secondary storage devices are customer property and cannot be easily accessed by a manufacturer (and/or seller, supplier, provider, or the like) of the data processing system without the customer's prior consent (e.g., permission). Thus, using primary memory instead of secondary storage for OS installation and repair (as well as other memory/storage-consuming processes that will be described in more detail below) is more advantageous and beneficial.

However, if space within the primary memory is not first reserved (e.g., by the customer or automatically by the data processing system itself), there may not be enough space available within the primary memory to perform certain tasks. For example, the data processing system is not aware that space in the primary memory should be reserved, there may not be enough space in the primary memory to store an OS recovery image during an OS repair process of the data processing system. Disadvantageously, slower secondary storage will have to be used instead of the faster primary memory. Furthermore, primary memory is non-persistent in nature, so such data (e.g., the OS recovery image) that is stored in the RAM may be unintentionally deleted across reboots of the data processing system and become unavailable for use.

Thus, not only is there the above-discussed inconveniences when using primary memory available in a data processing system, but there is also a long-felt need in the present technical field of embodiments disclosed herein to ensure that there is enough primary memory space and to retain certain data stored in the primary memory space (e.g., across reboots) in order to complete one or more processes (e.g., OS installation, OS repair, device firmware rollback and update, or the like).

To resolve such inconveniences and solve the long-felt need in the present technical field of embodiments disclosed, a management entity (e.g., management entity 110 discussed below in more detail in reference to FIG. 1B) may be configured to reserve space within primary memory and make such space that was originally non-persistent to become persistent (namely, pseudo-persistent). This advantageously leads to the creation of persistent reserved primary memory (also referred to herein as "persistent reserved RAM") where data stored in one or more reserved spaces (e.g., one or more created persistent reserved primary memory) within the primary memory is no longer lost (e.g., remains accessible) across reboots (namely, warm reboots) of the data processing system.

Creation of such persistent reserved primary memory advantageously allows for faster completion of certain processes (OS installation, OS repair, device firmware rollback and update, or the like) that originally required access to data stored in slower secondary storage. Thus, embodiments disclosed herein not only resolves the long-felt need of being able to use the faster primary memory instead of slower secondary memory for such processes, but also effectively contribute (e.g., leads) to a direct improvement to the functionalities (e.g., computer functionalities) of the data processing system in which the persistent reserved primary memory is created.

In an embodiment, a method for managing use and access to memory installed within a data processing system is provided. The method may include: generating reserved region data, the reserved region data specifies a memory address range of a volatile memory device of the data processing system; creating, using the reserved region data, a reserved region in the volatile memory device; storing data into the reserved region, the data stored into the reserved region is preserved in the volatile memory device across one or more warm reboots of the data processing system; and using the data stored in the reserved region to provide one or more computer implemented services offered by the data processing system to another data processing system or to perform one or more computer implemented processes of the data processing system.

An original copy of the data stored in the reserved region of the volatile memory device is stored in a storage device of the data processing system, the storage device being non-volatile memory device, the storage device being slower than the volatile memory device. Using the data stored in the reserved region to perform the one or more computer implemented processes of the data processing system or to implement the one or more computer implemented services offered by the data processing system comprises using the data stored in the reserved region instead of the original copy stored in the storage device.

The volatile memory device is a random access memory (RAM) of the data processing system. Unless one or more components of the data processing system that performs the one or more computer implemented processes or the one or more computer implemented services detects that the data exists in the RAM, the one or more components defaults to using the original copy stored in the storage device.

The reserved region data is generated by a startup manager of the data processing system during a preboot stage of the data processing system. The reserved region is created by the startup manager. Creating the reserved region may include, by the startup manager, storing the memory address range specified in the reserved region data into a non-volatile random access memory (NVRAM) of the data processing system.

The memory address range is stored as an NVRAM variable in the NVRAM.

The method may further include: after storing the memory address range into the NVRAM, booting, by the startup manager, a management entity of the data processing system, the management entity being different from a host of the data processing system; obtaining, by the management entity, the memory address range from the NVRAM; and creating, by the management entity, a file system in a portion of the volatile memory device that corresponds to the memory address range.

The management entity is booted, by the startup manager, using boot files of the management entity that are stored in a secured portion of a storage device of the data processing system.

The storage device is a nonvolatile memory express (NVMe) based solid-state drive (SSD) and the secured portion is a relay protected memory block (RPMB).

Storing data into the reserved region may include storing the data, by the management entity into the file system created in the portion of the volatile memory device that corresponds to the memory address range. The method may further include: performing, by the management entity, a warm reboot of the data processing system to shut down the management entity and return control of the data processing system to the startup manager.

The warm reboot causes deletion of the memory address range in the NVRAM but not the deletion of the data stored in the reserved region.

A non-transitory media may include instructions that when executed by at least a processor of a data processing system cause the computer-implemented method to be performed by the data processing system.

A data processing system may include the non-transitory media and a processor, and may perform the computer-implemented method when processor executes the instructions in the non-transitory media.

Turning to FIG. 1A, a block diagram illustrating a system in accordance with an embodiment is shown. The system shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, a data processing system may execute a method for managing use and access to memory installed within a data processing system are disclosed. Primary memory (e.g., RAM such as DRAM, SRAM, or the like) that is traditionally non-persistent (e.g., volatile) is configured by a management entity hosted within the data processing system to become persistent (e.g., pseudo-persistent/pseudo non-volatile) to create a persistent reserved primary memory.

Data may be stored in the created persistent reserved primary memory to allow processes that previously have to access slower secondary storage to obtain and use the data to be completed faster. The creation of the persistent reserved primary memory may be completed before a full start up process of the data processing system is completed. The data stored in the persistent reserved primary memory may also be retained (e.g., may not be lost) across reboots of the data processing system.

Thus, the above-discussed improvements of embodiments disclosed herein and the long-felt need in the present technical field of embodiments disclosed herein for an improved mechanism for using the primary memory installed in the data processing system may be obtained (e.g., realized).

To provide the above noted functionality, the system of FIG. 1A may include any number of data processing systems 100 (e.g., data processing systems 100A-100N). Data processing systems 100 may provide the computer implemented services to users of data processing systems 100 and/or to other devices (not shown). Different data processing systems may provide similar and/or different computer implemented services.

To provide the computer implemented services, data processing systems 100 may include various hardware components (e.g., processors, memory modules, storage devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 100 may host various services that provide the computer implemented service (e.g., application services) and/or that manage the operation of these services (e.g., management services). The aggregate (e.g., combination) of the management and application services may be a complete service that provide desired functionalities.

To manage the data processing systems 100, the system of FIG. 1A may include data processing system manager 102. Data processing system manager 102 may include various hardware components (e.g., processors, memory modules, storage devices, etc.) and host various software components (e.g., operating systems, application, startup managers such as basic input-output systems, etc.). These hardware and software components may provide the functionalities (e.g., the communication with and management of the data processing systems) of the data processing system manager 102.

In one example, the data processing system manager 102 may be a computing device (e.g., computing device of FIG. 4) such as a desktop computer or server that is used by used by manufacturers (or distributors, administrators, etc.) of one or more components installed within the data processing systems 100 to communicate with and manage (namely, the components installed within) the data processing systems 100.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Figure 1B:
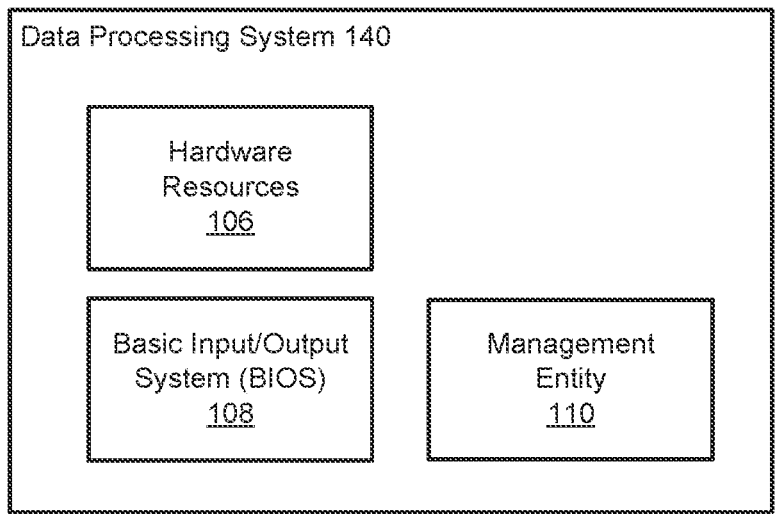
FIG. 1B shows a block diagram illustrating a data processing system in accordance with one or more embodiments.

Turning to FIG. 1B, a diagram illustrating data processing system 140 in accordance with an embodiment is shown. Data processing system 140 may be similar to any of the data processing systems 100 shown in FIG. 1A.

To provide computer implemented services, data processing system 140 may include any quantity of hardware resources 106. Hardware resources 106 may include physical parts of data processing system 140 that store and run software. Hardware resources 106 may include processors, memory modules (e.g., the above-discussed primary memory of a computing device), storage devices (e.g., the above-discussed secondary storage of a computing device), and/or other types of hardware components usable to provide computer implemented services. A basic input/output system (BIOS) 108 may be stored on the processors and memory modules (also referred to herein simply as "memory").

In the context of embodiments disclosed herein, the term "memory" refers specifically to volatile (or temporarily non-volatile) data retaining modules and devices (e.g., volatile computer-readable mediums) installed within the data processing system 140 that are used by the data processing system to facilitate faster read and write operations. The term "memory" may specifically refer to primary memory such as RAM, SRAM, DRAM, NVRAM, or the like. The terms "storage" and "storage device", on the other hand, refer specifically to data retaining modules and devices such as HDDs, SSDs, or the like that are non-volatile (e.g., retains data long-term even when the data processing system 140 is powered down and no power is being provided to these modules and devices) (e.g., non-volatile computer-readable mediums (also referred to herein as "non-transitory machine-readable medium")). "Storage" and "storage device" act as a permanent repository for the operating system (OS), applications, and files being stored in the data processing system 140.

BIOS 108 may be used (e.g., as a startup manager) to startup data processing system 140. On the startup, BIOS 108 may configure peripheral devices, such as a keyboard, mouse, monitor, etc. With the peripheral devices, BIOS 108 may configure hardware resources 106 for use by data processing system 140. After BIOS 108 has configured the peripheral devices and hardware resources 106 for use by data processing system 140, management entity 110 may be activated. In embodiments, the BIOS 108 may be (and/or include) unified extensible firmware interface (UEFI) compliant firmware/image.

Management entity 110 may be software similar to an operating system that is hosted by a processor of the data processing system 140 (e.g., the management entity is 110 is different from the OS (e.g., the host) of the data processing system 140). Management entity 110 may also be instantiated as any of drivers, network stacks, and/or other software entities that provide various management functionalities. Management entity 110 may interface between hardware and/or software in data processing system 140. Through interfacing, management entity 110 permits the software to access computing resources from the hardware (e.g., the hardware resources 106). Likewise, the hardware facilitates data processing by the software through use of the hardware resources 106. In an example of one or more embodiments, the management entity 110 may implemented using one or more Kubernetes-based pods (e.g., a group of one or more containers, with shared storage and network resources, and a specification for how to run the containers).

While FIG. 1B is illustrated as including a limited number of specific components, a data processing system (e.g., the computing device in FIG. 4) in accordance with one or more embodiments may include fewer, additional, and/or different components than those illustrated therein.

Figure 1C:
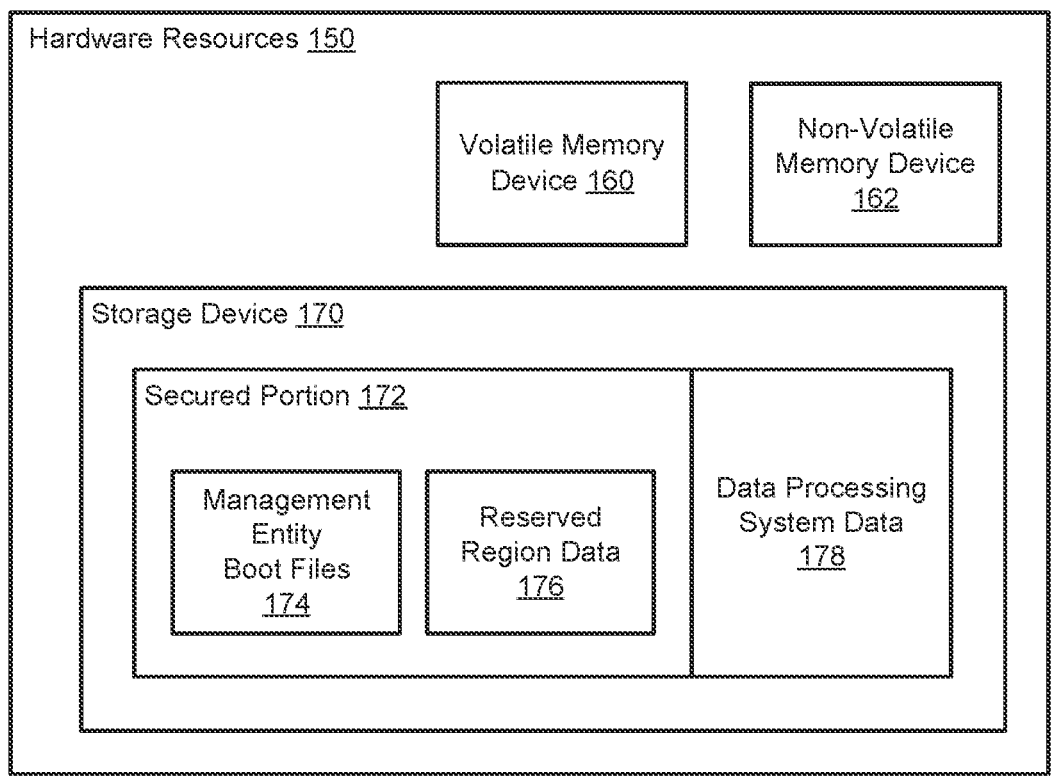
FIG. 1C shows a block diagram illustrating hardware resources in accordance with one or more embodiments.

Turning now to FIG. 1C, FIG. 1C shows an example of one or more hardware resources 150 of data processing system 140. Hardware resources 150 may be similar to hardware resources 106 shown in FIG. 1B.

Hardware resources 150 may include a volatile memory device 160 and a non-volatile memory device 162 that make up the primary memory of the data processing system 140. Hardware resources 150 may also include a storage device 170 (such as a nonvolatile memory express (NVMe) based solid-state drive (SSD) that includes a relay protected memory block (RPMB), or the like).

In embodiments, volatile memory device 160 may include any of, for example, but not limited to: SRAM, DRAM, or the like. Essentially, volatile memory device 160 may be any type of non-persistent memory module(s) and/or memory device(s). Non-volatile memory device 162 may be, for example, but not limited to: NVRAM, or the like. Essentially, non-volatile memory device 162 may be any type of persistent (or temporarily persistent) memory module(s) and/or memory device(s).

In embodiments, storage device 170 may be any form of secondary storage (e.g., SSDs, HDDs, NVMe based SSDs with RPMBs, or the like) made up of a storage device or module that is connected to the processor of the data processing system 140 via an interface (e.g., a communication and/or data bus).

Storage device 170 may include a secured portion 172 (e.g., a secured partition and/or space in the full space of the storage device 170) that is protected by one or more security protocols. For example, the secured portion 172 may be, but is not limited to, a RPMB. Access to the secured portion 172 is only allowed if proper authentication is completed. For example, for a component (e.g., any of the BIOS 108, hardware resources 106, and the management entity 110) of the data processing system 140 to access the secured portion 172, that component must have an authentication mechanism (e.g., an authentication key such as an RPMB key, or the like) that can be used to successfully authenticate that component with the security protocol(s) configured in the secured portion 172.

As shown in FIG. 1C, the secured portion 172 of the storage device 170 may include management entity boot files 174 and reserved region data 176.

In embodiments, management entity boot files 174 may include all files and data (e.g., all files and data making up a boot loader) needed (e.g., by BIOS 108 and hardware resources 106) to boot up the management entity 110. The management entity boot files 174 may be stored in a boot partition configured in the storage device 170. The boot partition may be protected by the security protocol(s) of the secured portion 172.

In embodiments, the reserved region data 176 may be a data structure of any form and size (e.g., a file, a piece of data, a line of code, or the like) that specifies a memory address range of the volatile memory device 160 that is to be reserved as the reserved persistent primary memory. For example, assume that the volatile memory device 160 has a full address range of A-Z covering 8 GBs (e.g., the volatile memory device 160 is made up of 8 GBs of RAM), the reserved region data 176 may include a memory address range that covers part or all of this full address range of A-Z covering the 8 GBs. Additional details to the reserved region data 176 is discussed below in reference to FIGS. 2A-2C.

In embodiments, the storage device 170 may also include data processing system data 178 stored in a non-secured portion of the storage device 170. The data processing system data 178 may include user data (not shown) (e.g., traffic statistics, packet headers, service requests, operating system calls, file-system changes, file systems, files, documents, applications, or the like) associated with (and is required to complete a full startup of) one or more OSs installed in the data processing system 140.

While FIG. 1B is illustrated as including a limited number of hardware resources 150 and a limited number of data stored in these hardware resources 150 (e.g., in storage device 170), a data processing system (e.g., the computing device in FIG. 4) in accordance with one or more embodiments may include fewer, additional, and/or different hardware resources 150 and may include fewer, additional, and/or different stored data than those illustrated therein.

Figure 2A:
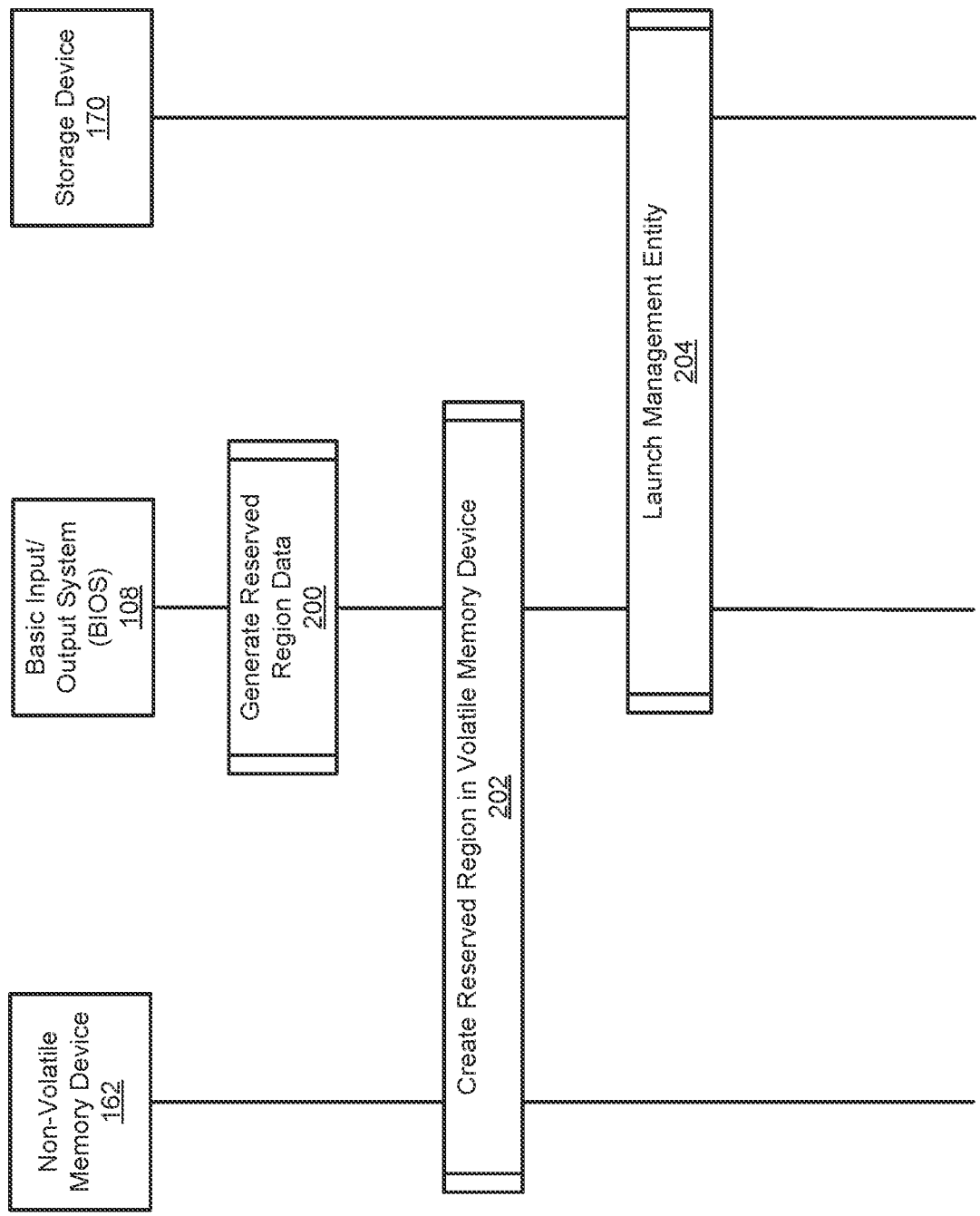
FIGS. 2A-2C show data flow diagrams in accordance with one or more embodiments.
Figure 2B:
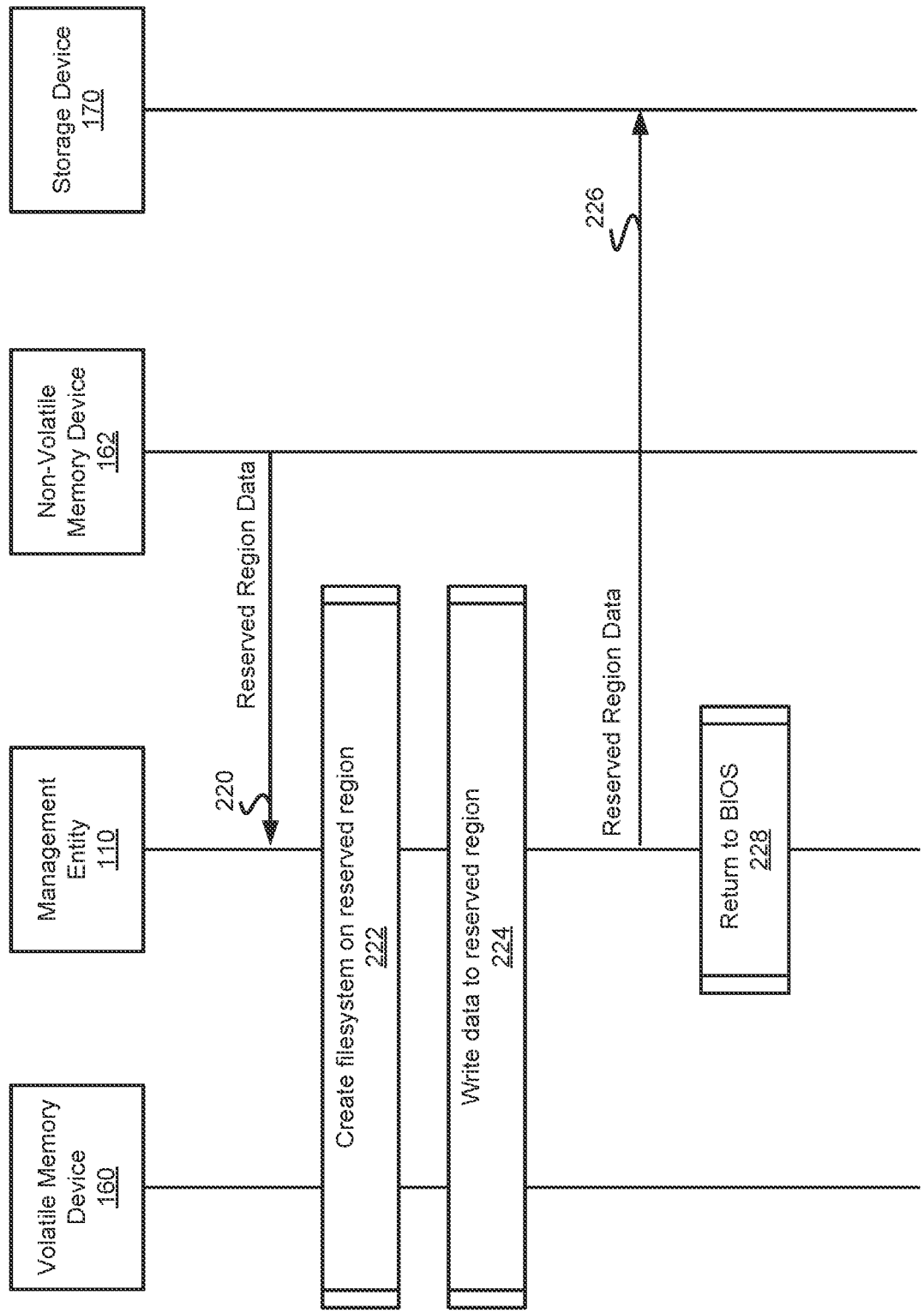
Figure 2C:
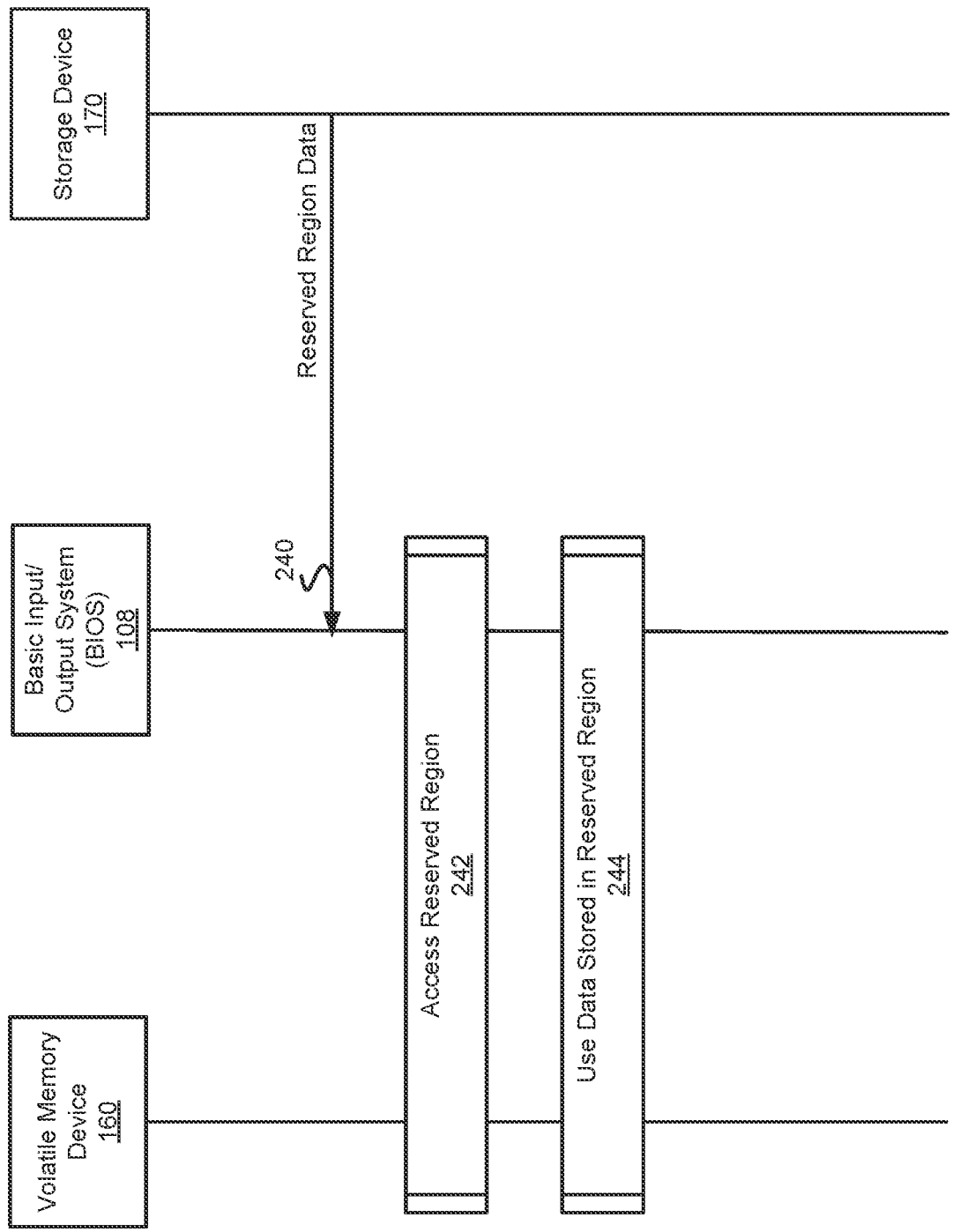

Turning to FIGS. 2A-2C, data flow diagrams in accordance with one or more embodiments are provided. The data flow diagrams of FIGS. 2A-2C show a process managing use and access to memory (namely, the volatile memory device 160 of FIG. 1C) installed within a data processing system that is shared between a plurality of abstracted resources hosted on the data processing system (such as computing devices, as described below in reference to FIG. 4; data processing system 140, FIG. 1B; any of data processing systems 100A-100N, FIG. 1A).

Starting with FIG. 2A, in operation 200, the BIOS 108 (e.g., BIOS 108 of FIG. 1B) generates reserved region data. The reserved region data includes at least a memory address range of the volatile memory device 160 (e.g., volatile memory device 160 of FIG. 1C). This memory address range of the volatile memory device 160 indicates which portion (or all) of the volatile memory device 160 that is going to be used to create persistent reserved primary memory. In embodiments, operation 200 may be conducted (e.g., performed) during a preboot stage of the data processing system.

In embodiments, the memory address range may be manually set by a user and/or administrator of the data processing system 140 (e.g., using the BIOS 108).

Alternatively, the memory address range may be automatically set by the BIOS 108 based on one or more pre-defined (and/or pre-stored) operations in the data processing system's boot files (e.g., bootloader). Said another way, the pre-defined (and/or pre-stored) operations may be wholly automatic processes that cannot be interrupted or intervened by a user (e.g., the customer owning) the data processing system 140. In embodiments, these pre-defined (and/or pre-stored) operations may be provided to the data processing system 140 and be continuously updated by the data processing system manager 102 of FIG. 1A.

For example, assume that the persistent reserved primary memory is used for storing an OS recovery file of the data processing system such that the data processing system (e.g., through the BIOS 108 and hardware resources 106) will be able to use the volatile memory device 160 (e.g., RAM) instead of the slower storage device 170 to perform the OS recovery. The data processing system 140 may be pre-configured (e.g., by an administrator, seller, producer, manufacturer, servicer, or the like) such that the data processing system 140 (e.g., through using BIOS 108) will automatically create the persistent reserved primary memory each time this OS recovery process is initiated (e.g., to advantageously complete the OS recovery process faster using the faster RAM).

In embodiments, each of these one or more pre-defined (and/or pre-stored) operations may include conditions set by the administrator (or seller, producer, manufacturer, servicer, or the like). Using the above OS recovery example, a condition may include not creating the persistent reserved primary memory until the OS recovery process has first failed three times.

Based on the above, one of ordinary skill in the art will appreciate that any types of conditions may be set for these one or more pre-defined (and/or pre-stored) operations without departing from the scope of embodiments. One of ordinary skill in the art will also appreciate that these one or more pre-defined (and/or pre-stored) operations may be associated with any type of computer implemented services offered by the data processing system and/or any type of computer implemented processes performed by the data processing system. For example, the persistent reserved primary memory may be created for, to name a few examples: OS recovery and installation; device firmware rollback and update; BIOS update and rollback, synchronization of device firmware to the latest firmware; local telemetry data storage in case of network non-availability; data storage services (e.g., storing an artificial intelligence (AI) engine, or any other data) using RAM; storage of user event logs to track system failure(s) of the data processing system; or the like.

Additionally, one of ordinary skill in the art will also appreciate that any amount of the volatile memory device 160 (e.g., RAM) may be reserved as long as the volatile memory device 160 still has enough remaining non-reserved space to properly execute necessary functionalities of the data processing system 140 (e.g., enough space to perform processes being executed by the BIOS 108 or the like).

In operation 202, the BIOS 108 uses the non-volatile memory device 162 (e.g., NVRAM) to create a reserved region in the volatile memory device 160. In particular, the BIOS 108 stores the reserved region data as an NVRAM variable into the NVRAM. Creation and storage of the NVRAM variable complete the reservation of the memory address range of the volatile memory device 160 that is specified in the reserved region data.

In operation 204, after creating and storing the NVRAM variable, the BIOS 108 launches (e.g., boots up) a management entity (e.g., management entity 110 of FIG. 1B) of the data processing system 140.

In embodiments, a bootloader (e.g., boot files) of the management entity may be stored in a boot partition created in storage device 170. The boot partition may be protected in a secured portion (e.g., secured portion 172 of FIG. 1C) of the storage device 170. For example, the storage device 170 may be a NVMe based SSD with a RPMB. The bootloader of the management entity 110 may be protected by the RPMB.

In embodiments, launching the management entity 110 is different from launching a host (e.g., an OS) of the data processing system 140. As discussed above in reference to FIG. 1B, the management entity is 110 is different from the OS (e.g., the host) of the data processing system 140. In embodiments, the management entity 110 may be mounted on the host of the data processing system 140. Said another way, launching the management entity 110 does not complete a startup of the data processing system 140. In operation 204, the data processing system 140 may still be in a preboot stage even after the management entity 110 is launched and fully operational.

Turning now to FIG. 2B, after the management entity 110 is launched and becomes fully operational, the management entity 110 retrieves the reserved region data (e.g., in operation 220 of FIG. 2B) from the non-volatile memory device 162. For example, the management entity 110 may use one or more runtime services of the data processing system 140 to retrieve the NVRAM variable from the NVRAM.

In operation 222, the management entity 110 uses the retrieved reserved region data to create and mount a file system (or any other similar data structure for storing and/or categorizing data) on the memory address range (of the volatile memory device 160) (also referred to herein as "reserved region") that is specified in the reserved region data. Said another way, the file system is created and mounted in a portion of the volatile memory device 160 that corresponds to the memory address range specified in the reserved region data.

One of ordinary skill in the art would appreciate that any appropriate techniques and/or operations may be used to create and mount the file system onto the specified memory address range without departing from the scope of embodiments disclosed herein.

In operation 224, the management entity 110 writes data into the file system that is created and mounted on the reserved region (of the volatile memory device 160). In embodiments, the management entity 110 may download (e.g., retrieve) the data from the storage device 170. Said another way, the storage device 170 is initially storing a carbon copy (or could also be referred to as an original copy) of the data to be written into the reserved region.

In embodiments, information regarding the data to be written into the reserved region may be included in the above-discussed pre-defined (and/or pre-stored) operations (as discussed above in operation 200 of FIG. 2A). Using the above OS recovery example, the storage device 170 may be storing the OS recovery file. A copy of the OS recovery file is made (e.g., by the management entity) and written (e.g., saved, stored, or the like) into the reserved region of the volatile memory device 160.

In operation 226, once all the required and/or specified data is written into the file system mounted on the reserved region of the volatile memory device 160, the management entity 110 stores the reserved region data (that was retrieved in operation 220) into the storage device 170 (namely, the secured portion 172 of the storage device 170). For example, the reserved region data is stored into an RPMB of the NVMe SSD that makes up an example of the storage device 170.

One of ordinary skill will also appreciate that the management entity 110 may store the reserved region data into any other secure region (e.g., secure space) of the data processing system 140 without departing from the scope of embodiments disclosed herein. Said another way, the management entity 110 may store the reserved region data anywhere within the data processing system 140 as long as the reserved region data is protected by some form of security protocol that prevents the reserved region data from being easily accessible to any third-party actor that hacks into (e.g., compromises) one or more portions (e.g., components and/or functionalities) of the data processing system 140.

In operation 228, the management entity 110 executes one or more processes to return control of the data processing system 140 to the BIOS 108 (e.g., the startup manager). In embodiments, such processes executed by the management entity 110 may be processes that do not completely cut power from the data processing system 140. Said another way, power to the data processing system 140 (including components of the data processing system 140) is maintained during such processes. For example, the management entity 110 may perform a warm reboot to shut down the management entity 110 and return the data processing system 140 to the BIOS 108.

In embodiments, when such processes to return control to the BIOS 108 (e.g., the warm reboot) is executed by the management entity 110, these processes will cause the reserved region data stored in the non-volatile memory device 162 to be lost (e.g., deleted) from the non-volatile memory device 162. For example, the warm reboot will cause the NVRAM variables in the NVRAM to be deleted, reset, cleared or the like. However, because power is always maintained to the data processing system 140 (namely, power to the volatile memory device 160 is maintained) during these processes, the data stored in the volatile memory device 160 (e.g., data written into the reserved region in operation 224) will be preserved (e.g., not deleted, cleared, removed, or the like). Said another way, as along as power to the volatile memory device 160 is not lost, data within the volatile memory device 160 will be preserved.

In embodiments, if the data processing system 140 loses power (e.g., power outage, hard/cold reset by user, or the like) at any time between operations 200 to 228, the processes shown in FIGS. 2A-2B will restart at operation 200. Upon restarting the process, the management entity 110 may (at any time before operation 228) delete the reserved region data that it previously stored in the secured portion 172 of the storage device 170. Alternatively, each time the management entity 110 writes an instance (or multiple instances) of the reserved region data to the secured portion 172 of the storage device 170, the management entity 110 may overwrite any previously stored (e.g., previously existing) instances of the reserved region data in the secured portion 172 of the storage device 170.

Turning now to FIG. 2C, after operation 228 where control of the data processing system 140 is returned to the BIOS 108 by the management entity 110, the BIOS may retrieve the reserved region data from the secured portion 172 of the storage device 170.

In operation 242, the BIOS 108 may use the reserved region data to access the reserved region to determine whether any data is stored in the reserved region. In the event that the BIOS 108 determines that there is data stored in the reserved region, the BIOS 108 may (e.g., as part of operation 244 and using any of the other resources and components (e.g., hardware resources 106, software applications, or the like) of the data processing system 140) execute one or more operations to use the data stored in the reserved region (e.g., to execute one or more of the above-discussed computer implemented processes and/or computer implemented services associated with the data stored in the reserved region).

In embodiments, unless the BIOS 108 detects (e.g., determines) that the data exists in the volatile memory device 160 (e.g., RAM), the BIOS 108 (and one or more other components of the data processing system) will default to using the original copy of the data that is stored in the storage device 170.

One of ordinary skill will appreciate that the processes and operations executed by the BIOS 108 (in combination with the other resources and components of the data processing system 140) may depend on what computer implemented processes and/or computer implemented services are being performed/provided.

Additionally, because these computer implemented processes and/or computer implemented services are now being performed/provided through data stored in the volatile memory device 160 (e.g., RAM) instead of the same copy (e.g., carbon copy) of the data stored in the slower storage device 170, these computer implemented processes and/or computer implemented services can now be performed/provided faster than when these processes and/or services are using data stored in the slower storage device 170.

In embodiments, the data stored in the reserved region of the volatile memory device 160 (e.g., RAM) may be automatically deleted after the associated computer implemented processes and/or computer implemented services have been completed. For example, completion of some of these computer implemented processes and/or computer implemented services may cause the data processing system 140 to lose power (e.g., shut down completely), which will cause all data stored in the volatile memory device 160 (e.g., RAM) to be deleted, cleared, removed, or the like.

Figure 3:
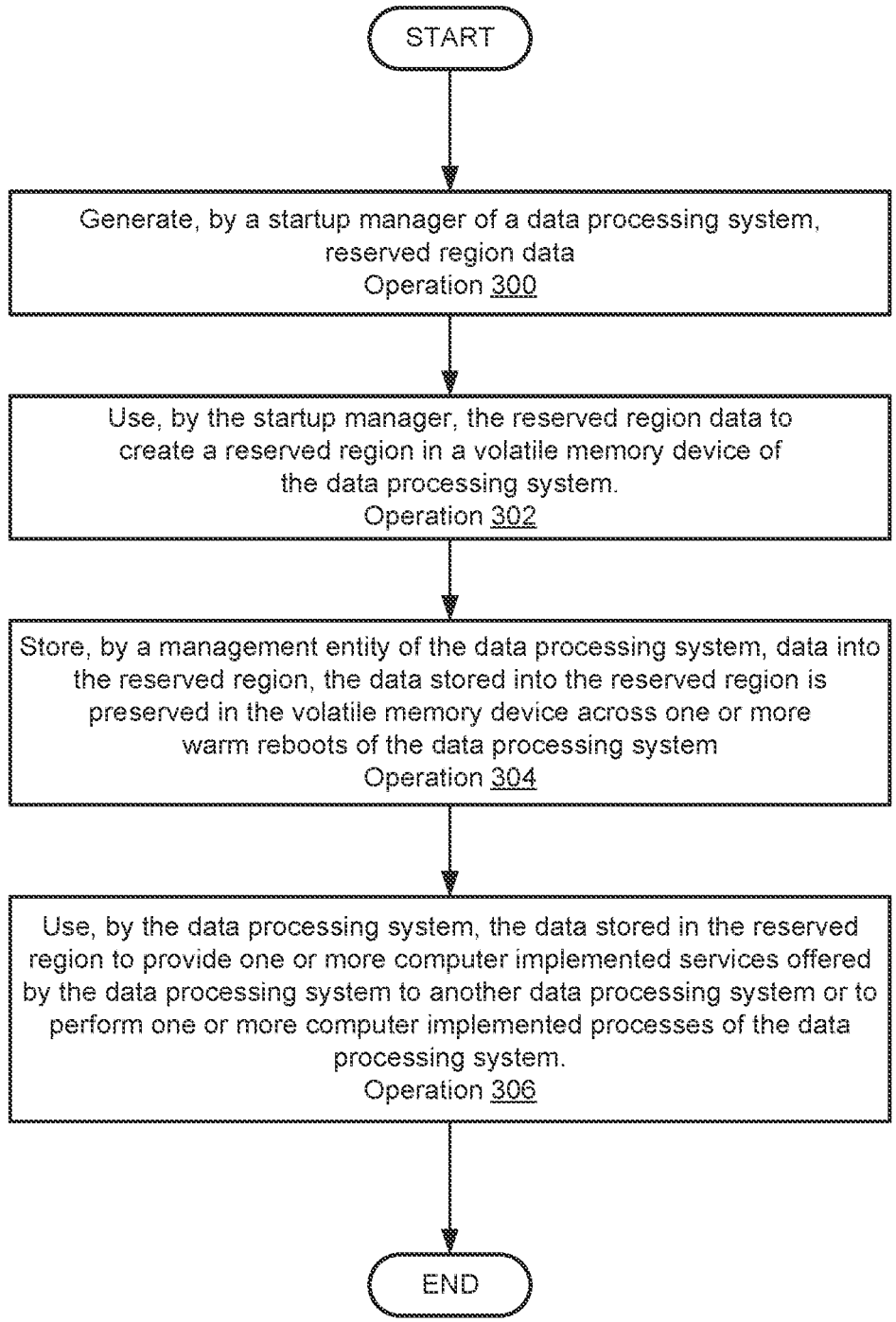
FIG. 3 shows a flowchart in accordance with one or more embodiments.

As discussed above, the components of FIGS. 1A-1C may perform various methods for managing a boot up process of a data processing system. FIG. 3 illustrates an example of a flowchart that may be performed by the components of FIGS. 1A-1C. For example, any of the data processing systems 100 may perform all or a portion of the flowchart. In the flowchart discussed below and shown in FIG. 3, any of the operations may be repeated, performed in different orders, and/or performed in parallel with or in a partially overlapping in time manner with other operations.

In operation 300, as discussed above in reference to FIG. 2A (namely in operation 200 of FIG. 2A), a startup manager of a data processing system may generate reserved region data to reserve one or more portions of a volatile memory device (e.g., volatile memory device 160 of FIG. 1C) of the data processing system (e.g., create a reserved region in the volatile memory device).

In operation 302, as discussed above in reference to FIG. 2A (namely in operation 202 of FIG. 2A), the startup manager may use the reserved region data to create the reserved region in the volatile memory device.

In embodiments, after the reserved region is created in operation 302, the startup manager may launch (e.g., as discussed above in reference to operation 204 of FIG. 2A) a management entity of the data processing system.

In operation 304, the management entity of the data processing system may store data (e.g., as discussed above in reference to operations 220 to 228 of FIG. 2B) into the reserved region.

In embodiments, the data stored into the reserved region is preserved in the volatile memory device across one or more warm reboots of the data processing system.

In operation 306, the data processing system (e.g., via the startup manager in combination without one or more other resources and/or components of the data processing system) may use (e.g., as discussed above in reference to operations 240 to 244 of FIG. 2C) the data stored in the reserved region to provide one or more computer implemented services offered by the data processing system to another data processing system or to perform one or more computer implemented processes of the data processing system.

This advantageously allows the data processing system to use the RAM (which is faster than storage devices (e.g., secondary storage) installed within the data processing system) to perform the processes and/or services. Thus, functionalities of the data processing system may be directly improved through the faster execution and completion of these processes and/or services.

Any of the components illustrated in FIGS. 1A-3 may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system-on-a-chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth® transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing use and access to memory installed within a data processing system, the method comprising:
   generating reserved region data, the reserved region data specifies a memory address range of a volatile memory device of the data processing system;
   creating, using the reserved region data and by a startup manager of the data processing system during a preboot stage of the data processing system, a reserved region in the volatile memory device;
   booting, by the startup manager, a management entity of the data processing system, the management entity being different from a host of the data processing system and takes control over the data processing system from the startup manager;
   storing, by the management entity and while the data processing system is still in the preboot stage, data into the reserved region, the data stored into the reserved region is preserved in the volatile memory device across one or more warm reboots of the data processing system;
   performing, by the management entity and after the management entity stores the data into the reserved region, a warm reboot of the data processing system to shut down the management entity and return control of the data processing system back over to the startup manager, the warm reboot being one of the one or more warm reboots; and
   using, after the warm reboot, the data stored in the reserved region to provide one or more computer implemented services offered by the data processing system to another data processing system or to perform one or more computer implemented processes of the data processing system.

2. The method of claim 1, wherein
an original copy of the data stored in the reserved region of the volatile memory device is stored in a storage device of the data processing system, the storage device being non-volatile memory device, the storage device being slower than the volatile memory device, and
using the data stored in the reserved region to perform the one or more computer implemented processes of the data processing system or to implement the one or more computer implemented services offered by the data processing system comprises using the data stored in the reserved region instead of the original copy stored in the storage device.

3. The method of claim 2, wherein
the volatile memory device is a random access memory (RAM) of the data processing system, and
unless one or more components of the data processing system that performs the one or more computer implemented processes or the one or more computer implemented services detects that the data exists in the RAM, the one or more components defaults to using the original copy stored in the storage device.

4. The method of claim 1, wherein
the reserved region data is also generated by the startup manager of the data processing system during the preboot stage of the data processing system, and
creating the reserved region comprises, by the startup manager, storing the memory address range specified in the reserved region data into a non-volatile random access memory (NVRAM) of the data processing system.

5. The method of claim 4, wherein the memory address range is stored as an NVRAM variable in the NVRAM.

6. The method of claim 4, further comprising and before storing the data into the reserved region by the management entity:
obtaining, by the management entity, the memory address range from the NVRAM; and
creating, by the management entity, a file system in a portion of the volatile memory device that corresponds to the memory address range.

7. The method of claim 6, wherein the management entity is booted, by the startup manager, using boot files of the management entity that are stored in a secured portion of a storage device of the data processing system.

8. The method of claim 7, the storage device is a non-volatile memory express (NVMe) based solid-state drive (SSD) and the secured portion is a relay protected memory block (RPMB).

9. The method of claim 6, wherein
storing data into the reserved region comprises storing the data, by the management entity, into the file system created in the portion of the volatile memory device that corresponds to the memory address range.

10. The method of claim 4, wherein the one or more warm reboots cause deletion of the memory address range in the NVRAM but not the deletion of the data stored in the reserved region.

11. A non-transitory machine-readable medium having instructions stored therein, which when executed by a processor, cause the processor to perform operations for managing use and access to memory installed within a data processing system, the operations comprising:

generating reserved region data, the reserved region data specifies a memory address range of a volatile memory device of the data processing system;
creating, using the reserved region data and by a startup manager of the data processing system during a preboot stage of the data processing system, a reserved region in the volatile memory device;
booting, by the startup manager, a management entity of the data processing system, the management entity being different from a host of the data processing system and takes control over the data processing system from the startup manager;
storing, by the management entity and while the data processing system is still in the preboot stage, data into the reserved region, the data stored into the reserved region is preserved in the volatile memory device across one or more warm reboots of the data processing system;
performing, by the management entity and after the management entity stores the data into the reserved region, a warm reboot of the data processing system to shut down the management entity and return control of the data processing system back over to the startup manager, the warm reboot being one of the one or more warm reboots; and
using, after the warm reboot, the data stored in the reserved region to provide one or more computer implemented services offered by the data processing system to another data processing system or to perform one or more computer implemented processes of the data processing system.

12. The non-transitory machine-readable medium of claim 11, wherein
an original copy of the data stored in the reserved region of the volatile memory device is stored in a storage device of the data processing system, the storage device being non-volatile memory device, the storage device being slower than the volatile memory device, and
using the data stored in the reserved region to perform the one or more computer implemented processes of the data processing system or to implement the one or more computer implemented services offered by the data processing system comprises using the data stored in the reserved region instead of the original copy stored in the storage device.

13. The non-transitory machine-readable medium of claim 12, wherein
the volatile memory device is a random access memory (RAM) of the data processing system, and
unless one or more components of the data processing system that performs the one or more computer implemented processes or the one or more computer implemented services detects that the data exists in the RAM, the one or more components defaults to using the original copy stored in the storage device.

14. The non-transitory machine-readable medium of claim 11, wherein
the reserved region data is also generated by the startup manager of the data processing system during the preboot stage of the data processing system, and
creating the reserved region comprises, by the startup manager, storing the memory address range specified in the reserved region data into a non-volatile random access memory (NVRAM) of the data processing system.

15. The non-transitory machine-readable medium of claim 14, wherein the memory address range is stored as an NVRAM variable in the NVRAM.

16. A data processing system comprising:
a processor; and
a non-transitory machine-readable medium coupled to the processor, wherein the non-transitory machine-readable medium stores instructions that causes the data processing system to perform operations for managing use and access to memory installed within a data processing system, the operations comprising:
generating reserved region data, the reserved region data specifies a memory address range of a volatile memory device of the data processing system;
creating, using the reserved region data and by a startup manager of the data processing system during a preboot stage of the data processing system, a reserved region in the volatile memory device;
booting, by the startup manager, a management entity of the data processing system, the management entity being different from a host of the data processing system and takes control over the data processing system from the startup manager;
storing, by the management entity and while the data processing system is still in the preboot stage, data into the reserved region, the data stored into the reserved region is preserved in the volatile memory device across one or more warm reboots of the data processing system;
performing, by the management entity and after the management entity stores the data into the reserved region, a warm reboot of the data processing system to shut down the management entity and return control of the data processing system back over to the startup manager, the warm reboot being one of the one or more warm reboots; and
using, after the warm reboot, the data stored in the reserved region to provide one or more computer implemented services offered by the data processing system to another data processing system or to perform one or more computer implemented processes of the data processing system.

17. The data processing system of claim 16, wherein
an original copy of the data stored in the reserved region of the volatile memory device is stored in a storage device of the data processing system, the storage device being non-volatile memory device, the storage device being slower than the volatile memory device, and
using the data stored in the reserved region to perform the one or more computer implemented processes of the data processing system or to implement the one or more computer implemented services offered by the data processing system comprises using the data stored in the reserved region instead of the original copy stored in the storage device.

18. The data processing system of claim 17, wherein
the volatile memory device is a random access memory (RAM) of the data processing system, and
unless one or more components of the data processing system that performs the one or more computer implemented processes or the one or more computer implemented services detects that the data exists in the RAM, the one or more components defaults to using the original copy stored in the storage device.

19. The data processing system of claim 16, wherein
the reserved region data is also generated by the startup manager of the data processing system during the preboot stage of the data processing system, and
creating the reserved region comprises, by the startup manager, storing the memory address range specified in the reserved region data into a non-volatile random access memory (NVRAM) of the data processing system.

20. The data processing system of claim 19, wherein the memory address range is stored as an NVRAM variable in the NVRAM.

* * * * *